United States Patent Office 3,245,255
Patented Apr. 12, 1966

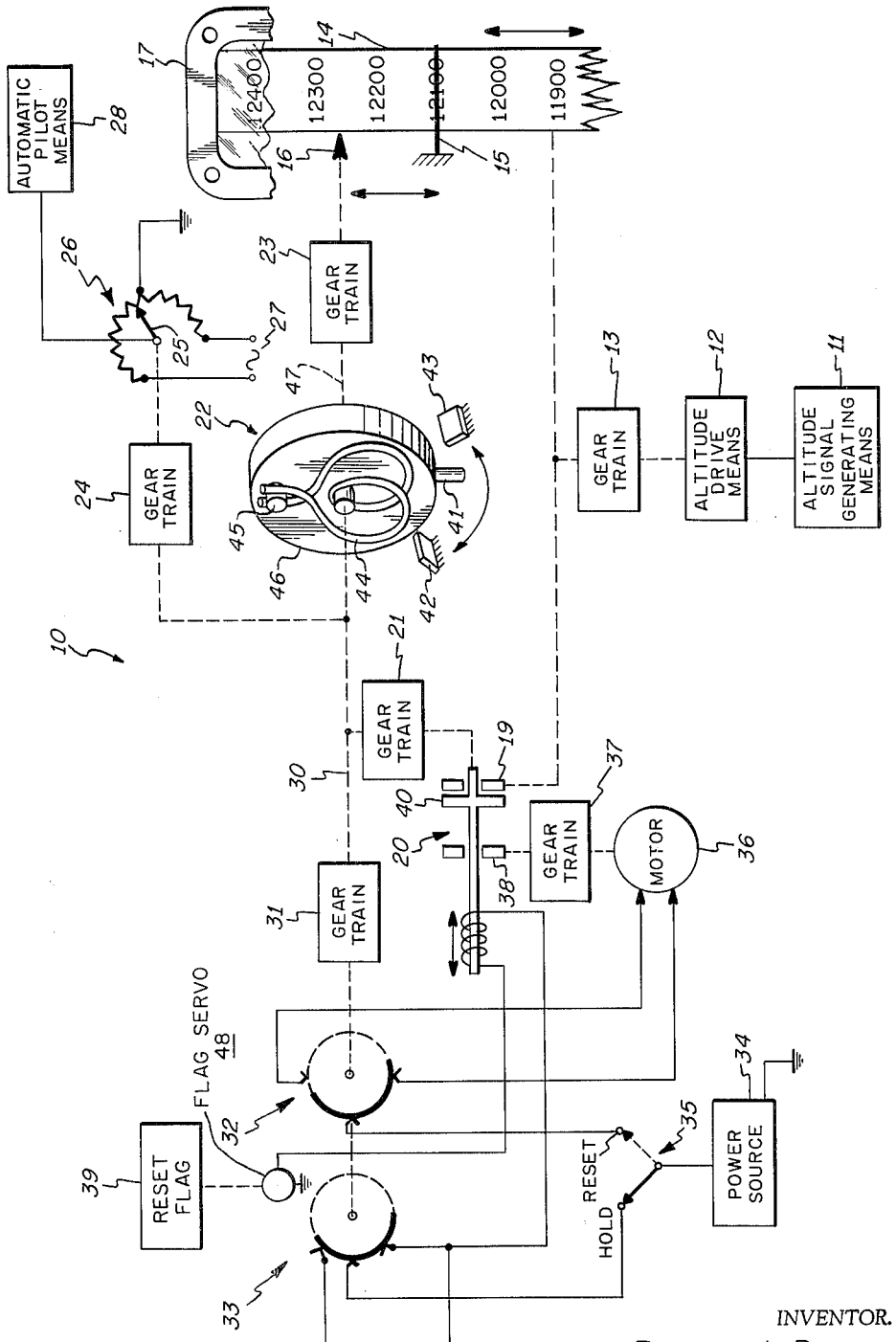

3,245,255
MULTIPLE RANGE SYSTEMS FOR ALTIMETERS
Robert J. Parsons, Racine, Wis., assignor to Sperry Rand Corporation, Great Neck, N.Y., a corporation of Delaware
Filed Sept. 20, 1962, Ser. No. 225,030
7 Claims. (Cl. 73—178)

The present invention relates to a system in which over a limited range of operation certain portions of the system are synchronized and over a wider range of operation fewer portions of the system are synchronized, but at least one portion of the system stores information in order that it is synchronized with the other portions when operating in said limited range.

The present invention is particularly applicable to altitude indicating and controlling systems for aircraft, for example, in which it is desirable to provide (a) a visual indication of the actual altitude of the craft over the complete range of craft altitude, (b) an indication of the desired altitude when in the altitude hold configuration, and (c) an electrical signal representative of the difference between the actual altitude and the desired altitude. When utilizing an altitude indicating instrument having a moving tape type of actual altitude presentation, the movement of a pointer representative of the desired altitude is necessarily limited by the opening in the face of the altitude indicating instrument. Normally this opening permits only a relatively small range of travel of the desired altitude pointer and over this narrow range the pointer movement must be synchronized with that of the tape. The electrical signal is provided by an error transducer to a flight control system which positions the aircraft control surfaces in a direction to return the aircraft to the desired altitude. Normally it is desirable that the range over which the error transducer provides a signal be greater than the range over which the pointer operates in order that the aircraft will be controlled by the electrical signal to return to the desired altitude although the pointer is beyond its visual range. Therefore, within the limited range of operation of the pointer, it is desirable that the tape, the pointer, and the error transducer be synchronized while, beyond the range of operation of the pointer, it is desirable that the tape and the error transducer be synchronized over an intermediate range while information is stored over the intermediate range to permit the pointer to be synchronized when re-entering the limited range of operation of the pointer. It is also desirable that beyond the intermediate range of the error transducer means are provided for disconnecting the error transducer and the pointer to prevent structural damage thereto while permitting the tape to continue to provide an indication of the actual altitude conditions of the craft.

It is therefore a primary object of the present invention to provide a system wherein over a particular range of operation portions of the system are synchronized, while over a different range of operation fewer portions of the system are synchronized, which is accomplished by simple, reliable means.

It is a further object of the present invention to provide an indicating and controlling device in which the entire indicating and controlling means are synchronized over a particular range of operation and over another range of operation only a portion of the indicating means and the controlling means are synchronized, which is achieved by means of simple, positive-acting apparatus.

The above objects are accomplished in an altitude indicating and controlling device, for example, having a tape which provides an indication of the actual altitude of an aircraft over a first range and a pointer operable over a limited second range within the first range and cooperative with the tape to provide an indication of a desired altitude. An altitude error transducer is operable over a third range including and greater than the second range for providing an electrical error signal representative of the difference between the actual and the desired altitude. The tape, pointer and error transducer are maintained synchronized over the second range. By means of a memory storage device connected between the pointer and the error transducer, the pointer and error transducer are maintained synchronized over the second range and the memory storage device stores information over the third range in order that the pointer and the error transducer are again synchronized when re-entering the second range.

The single drawing is a schematic diagram of an altitude indicating and controlling system incorporating the present invention.

Although the present invention will be explained with respect to an altitude indicating and controlling system, it will be appreciated that it is equally applicable to provide memory and synchronization of other types of systems.

In the altitude indicating and controlling system 10, an altitude signal generating means 11 provides a signal representative of the actual instantaneous altitude of the aircraft in which it is mounted. The altitude signal is connected to energize altitude drive means 12 which in turn are connected through a gear train 13 to drive a tape 14. The tape 14 is cooperative with a reference bar 15 to continuously provide a visual indication to the pilot of the actual altitude of the aircraft which, for example, is shown as 12,100 feet.

The system 10 is operable in two modes of operation, an altitude hold mode and a reset mode. In the altitude hold mode, the system 10 provides a visual indication of the desired altitude which the aircraft should hold as well as the actual altitude at which the aircraft is flying. The desired altitude indication is provided by a cursor or pointer 16 that is cooperative with the tape 14. The pointer 16 is driven by means of the altitude drive means 12 over the face of the indicating instrument 17 over a very limited altitude range substantially defined by the visual limits of the instrument 17 in a manner to be more fully explained.

The altitude drive means 12 is connected through the gear train 13 to a plate 19 of an electromechanical clutch 20. In the altitude hold mode, the clutch 20 engages the plate 19 in a manner to be described in order that the altitude drive means 12 is connected through the gear train 13, the clutch 20, a gear train 21, a memory storage device 22, a shaft 47 and a gear train 23 to the pointer 16. The memory storage device 22 may be of the type disclosed in FIG. 16 of U.S. Patent No. 1,992,970, issued March 5, 1935 to E. A. Sperry, Jr., et al., entitled Hydropneumatic Automatic Power or similar to that shown in U.S. Patent No. 2,830,762, issued April 15, 1958. In the altitude hold mode, the altitude drive means 12 is also connected through the gear train 13, the clutch 20, the gear train 21 and a gear train 24 to the wiper 25 of an altitude error transducer in the form of a potentiometer 26. The potentiometer 26 is energized from a power source 27 in order that the signal from the wiper 25 has an amplitude and phase representative of the magnitude and sense of the deviation of the aircraft from the desired altitude. The wiper 25 is connected to an automatic pilot means 28 to position the control surfaces of the aircraft in a direction to cause the aircraft to maintain the desired altitude.

The gear train 21, the input of the memory storage device 22 and the gear train 24 are connected by means of a common shaft 30. The shaft 30 is also connected through a gear train 31 to an electrical centering switch 32 and a memory range switch 33.

In the hold mode, a power source 34 is connected through a manual switch 35 to the switch 33 which in turn is connected to energize the coil of the electromechanical clutch 20. The switches 32 and 33 are commutator type switches. The memory range switch 33 in the hold mode provides a conductive path from the power source 34 through the switch 33 to energize the clutch 20 over the range of operation of the potentiometer 26. Beyond that range, the switch 33 disconnects the coil on the clutch 20 from the power source 34 and energizes a reset flag servo 48 connected between the switch 33 and the clutch coil to position a reset flag 39 in a manner to be explained.

In the reset mode, the electrical centering switch 32 connects the power source 34 through the switch 35 to energize a recycling motor 36 which drives in the direction to return the pointer 16 to the reference bar 15 and the wiper 25 to a null position. When the pointer 16 is aligned with the reference bar 15 and the wiper 25 is at a null, the switch 32 acts to disconnect the motor 36 from the power source 34. The motor 36 is connected by a gear train 37 to another plate 38 of the clutch 20. The plates 19 and 38 of the clutch 20 are alternatively cooperative with a matching plate 40 of the clutch 20 in the hold and reset modes, respectively. When the clutch 20 is energized, i.e. in the hold mode, the altitude drive means 12 is connected to the common shaft 30. Similarly, when the clutch 20 is de-energized, the plate 40 engages the plate 38 to connect the motor 36 to the shaft 30.

The movement of the pointer 16 is limited by means of a pin 41 mounted on the periphery of a rotatable disc 46 of the memory storage device 22 within the limits defined by limit stops 42 and 43 that are cooperative with the pin 41. The stops 42 and 43 are so arranged that with the pin 41 abutting one of the stops 42 and 43, the pointer 16 is stalled but remains visible on the face of the indicating instrument 17 at one of the extremities of the opening through which the tape 14 is viewed in order to continue to provide an indication that the craft is above or below the desired altitude although the pointer 16 is no longer synchronized with the tape 14. Within the limits defined by the stops 42 and 43, the rotation of the shaft 30 is transmitted to the pointer 16 by means of a preloaded spring 44 which has one portion connected to the shaft 30 and another portion cooperative with a projection 45 on a rotatable disc 46. The disc 46 is connected to the gear train 23. The structure and operation of the memory storage device 22 is more fully described with respect to a similar device in said U.S. Patent No. 2,830,762. The device 22 permits additional rotation of the shaft 30 after the pin 41 contacts one of the stops 42 or 43 to allow additional movement of the wiper 25 of the potentiometer 26 in order to provide control signals to the automatic pilot means beyond the limited range defined by the limits 42 and 43. As the shaft 30 continues to rotate, although the pin 41 contacts one of the stops 42 or 43, the spring 44 stores the amount of rotation beyond the contact point over an additional range of operation defined by the memory range switch 33 in a manner to be more fully explained with respect to a typical sequence of operation of the present invention.

In operation, when it is desired to maintain a predetermined altitude, the switch 35 is placed in the hold position, as shown in solid lines in the drawing, thereby energizing the clutch 20 and urging the plate 40 into contact with the plate 19 which connects the altitude drive means 12 to the common shaft 30. At the beginning of operation in the altitude hold mode, the pointer 16 is aligned with the reference bar 15 and the wiper 25 of the potentiometer 26 is centered, thereby providing no electrical signal output. As the aircraft deviates from the desired altitude, the altitude signal generating means 11 senses the altitude change and provides a signal causing the altitude drive means 12 to drive the tape 14 up or down depending upon the sense of the change and at a rate in accordance therewith. The pointer 16 travels in synchronism with the tape 14 within the range defined by the stops 42 and 43. The wiper 25 is also driven in synchronism with the tape 14 and the pointer 16 to provide a signal to the automatic pilot means 28 which controls the aircraft in a direction to reduce the altitude deviation error to zero.

Normally the altitude deviation error will be corrected before the pin 41 reaches the end of its range of travel as defined by one of the stops 42 or 43. However, in the event the altitude deviation error is not corrected within this range, the pointer 16 will travel with the tape 14 until the pointer 16 is stalled at one extremity of the face of the instrument 17 by the pin 41 abutting one of the stops 42 or 43 depending upon the sense of the deviation.

Although the range of movement of the pointer 16 has been exceeded and it is held fixed by means of the pin 41 contacting one of the stops 42 or 43, it is still necessary for the automatic pilot means 28 to endeavor to correct for the altitude deviation error. As the shaft 30 continues to rotate, the spring 44 of the memory storage device 22 "winds up" and stores the amount of rotation of the shaft 30. This permits the shaft 30 to continue to rotate the wiper 25 beyond the range defined by the limits 42 and 43 thus providing an electrical control signal having an increasingly greater amplitude representative of the increasing altitude deviation error in order to return the aircraft to the desired altitude. In the event the control signal begins to return the aircraft to the desired altitude within the range of the potentiometer 26 and the memory range switch 33, the shaft 30 will begin to rotate in the opposite direction thereby unwinding the spring 44 until the point is reached where the pin 41 no longer abuts one of the stops 42 or 43 and the pointer 16 is again driven in synchronism with the tape 14. The memory storage device 22, therefore, permits one-to-one drive-through motion when the pin 41 is off its limits 42 or 43, and when the pin 41 contacts one of its limits 42 or 43 the shaft 30 is permitted additional limited rotation while the device 22 stores the additional amount of rotation of the shaft 30. The range of operation defined by the stops 42 and 43 is usually slightly greater than the normal altitude deviation while the range of the potentiometer 26 and the memory range switch 33 is several times greater than the normal altitude deviation.

In the event of a malfunction in which the signal from the potentiometer 26 does not reduce the altitude deviation error and the deviation error continues to increase until the limit of the memory range switch 33 is reached, the memory range switch 33 disconnects the power source 34 from the coil of the clutch 20 causing its plate 40 to engage the plate 38 thereby disconnecting the altitude drive means 12 from the shaft 30. Simultaneously, the reset flag 39 comes into view on the face of the indicator 17 indicating that the system 10 must be reset.

To reset the system 10, the switch 35 is positioned to its dotted line position, as shown in the drawing, thereby providing excitation of the proper phase to the recycling motor 36 which causes it to drive through the clutch 20 to return the pointer 16 to the reference bar 15 and the wiper 25 to its centered null condition. The aircraft is then flown until the desired altitude appears under the reference bar 15, and at that time the switch 35 is placed in its hold position at which time the pointer 16 will again indicate any deviation from the desired altitude and the potentiometer 25 will provide an error signal representative of the magnitude and sense of the deviation from the new desired altitude.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. In an indicating and controlling device,
   (1) indicating tape means operable over a first range,
   (2) indicating cursor means operable over a second range and cooperative with said tape means for providing an indication,
   (3) transducer means operable over a third range including and greater than said second range,
   (4) positioning means connected to said tape means, cursor means and transducer means,
   (5) and analog storage means connected between said cursor means and said transducer means for maintaining said cursor means and said transducer means synchronized within said second range and beyond said second range said storage means stores information at each end of said second range to re-establish synchronization of said cursor means with said transducer means within said second range.
2. In a device as recited in claim 1 further including means adpated to be connected to said cursor means and
   transducer means for resetting of the synchronization of said tape means, cursor means and transducer means when said third range is exceeded.
3. In an indicating and controlling device for aircraft,
   (1) signal generating means for providing a signal representative of an actual condition of said craft,
   (2) first indicating means operable over a first range for providing a visual indication of said condition,
   (3) driving means responsive to said signal generating means and connected to drive said first indicating means,
   (4) second indicating means operable over a second range within said first range and cooperative with said first indicating means for providing an indication of the desired condition,
   (5) third error signal generating means operable over a third range including and greater than said second range and less than said first range for providing a signal representative of the differences between said actual and desired condition over said third range,
   (6) and means for synchronously driving said first, second and third means over said second range including means for driving said first means and said third means synchronously over said third range while storing the synchronized relation information beyond said second range and within said third range and for re-establishing said relation upon return to said second range.
4. In an altitude indicating and controlling device for aircraft,
   (1) altitude signal generating means for providing a signal representative of the actual altitude of said craft,
   (2) altitude indicating tape means operable over a first range for providing a visual indication of altitude,
   (3) altitude drive means responsive to said altitude signal generating means and connected to drive said altitude tape means,
   (4) desired altitude indicating means operable over a second range within said first range and cooperative with said altitude tape means for providing an indication of the desired altitude,
   (5) altitude error signal generating means operable over a third range including and greater than said second range and less than said first range for providing a signal representative of the difference between said actual and desired altitude over said third range,
   (6) and means for synchronously driving said tape, desired altitude and error means over said second range including means for driving said tape means and said error means synchronously over said third range while storing the synchronized relation information beyond said second range and within said third range and for re-establishing said relation upon return to said second range.
5. In a device as recited in claim 4 further including means adapted to be connected to said desired altitude and error means for resetting of the synchronization of said tape, desired altitude and error means when said third range is exceeded.
6. In an altitude indicating and controlling device for aircraft,
   (1) altitude signal generating means for providing a signal representative of the actual altitude of said craft,
   (2) altitude indicating tape means operable over a first range for providing a visual indication of the actual altitude of said craft,
   (3) altitude driving means responsive to said altitude signal generating means and connected to drive said tape means in accordance with the actual altitude of said craft,
   (4) indicating pointer means operable over a second range within said first range and cooperative with said tape means for providing an indication of the desired altitude within said second range,
   (5) error signal generating means operable over a third range including and greater than said second range and less than said first range for providing a signal representative of the difference between said actual and desired altitude over said third range,
   (6) and means for synchronously driving said tape, pointer and error means over said second range including means for driving said tape means and said error means synchronously over said third range while storing the synchronized relation information beyond said second range and within said third range and for re-establishing said relation upon return to said second range.
7. In an altitude indicating and controlling device for aircraft,
   (1) altitude signal generating means for providing a signal representative of the actual altitude of said craft,
   (2) altitude indicating tape means operable over a first range for providing a visual indication of the actual altitude of said craft,
   (3) altitude driving means responsive to said altitude signal generating means and connected to drive said tape means in accordance with the actual altitude of said craft,
   (4) indicating pointer means operable over a second range within said first range and cooperative with said tape means for providing an indication of the desired altitude within said second range,
   (5) error signal generating means operable over a third range including and greater than said second range and less than said first range for providing a signal representative of the difference between said actual and desired altitude over said third range.
   (6) means for synchronously driving said tape, pointer and error means over said second range, and
   (7) storage means connected between said pointer means and said error signal generating means for storing the synchronized relation information beyond said second range and within said third range and for re-establishing said relation upon return to said second range.

References Cited by the Examiner
UNITED STATES PATENTS

| | | | |
|---|---|---|---|
| 2,415,429 | 2/1947 | Kellogg et al. | 244—77 |
| 2,552,196 | 5/1951 | MacCallum et al. | 73—385 X |
| 2,553,309 | 5/1951 | Gabrielson et al. | 33—204.2 |
| 2,646,946 | 7/1953 | Newton | 244—77 |
| 2,656,721 | 10/1953 | Melchior | 73—386 X |
| 2,729,780 | 1/1956 | Miller et al. | 244—77 X |
| 2,748,355 | 5/1956 | Jarvis | 73—386 X |
| 2,782,395 | 2/1957 | Hammond. | |
| 3,018,661 | 1/1962 | Meredith et al. | 73—178 |

LOUIS R. PRINCE, *Primary Examiner.*

ROBERT B. HULL, *Examiner.*